United States Patent
Deshpande et al.

(10) Patent No.: US 7,221,761 B1
(45) Date of Patent: May 22, 2007

(54) ERROR RESILIENT DIGITAL VIDEO SCRAMBLING

(75) Inventors: Sachin Deshpande, Vancouver, WA (US); Wenjun Zeng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 744 days.

(21) Appl. No.: 09/665,215

(22) Filed: Sep. 18, 2000

(51) Int. Cl.
*H04N 7/167* (2006.01)
*G06K 9/36* (2006.01)

(52) U.S. Cl. ............. 380/216; 380/210; 380/213; 380/214; 382/276; 375/240.23

(58) Field of Classification Search ............ 380/216, 380/210, 213, 214; 382/276; 375/240.23
See application file for complete search history.

(56) References Cited

U.S. PATENT DOCUMENTS

| | | | |
|---|---|---|---|
| 4,100,374 A | 7/1978 | Jayant et al. | |
| 4,852,166 A | 7/1989 | Masson | |
| 4,964,162 A | 10/1990 | McAdam et al. | |
| 5,241,395 A * | 8/1993 | Chen | 358/426.14 |
| 5,268,961 A | 12/1993 | Ng | |
| 5,321,748 A | 6/1994 | Zeidler et al. | |
| 5,347,310 A * | 9/1994 | Yamada et al. | 375/240.03 |
| 5,375,168 A * | 12/1994 | Kudelski | 380/214 |
| 5,552,831 A | 9/1996 | Machida et al. | |
| 5,621,799 A | 4/1997 | Katta et al. | |
| 5,675,667 A * | 10/1997 | Suzuoki | 382/232 |
| 5,684,876 A | 11/1997 | Pinder et al. | |
| 5,703,889 A | 12/1997 | Shimoda et al. | |
| 5,745,504 A | 4/1998 | Båång | |
| 5,793,895 A | 8/1998 | Chang et al. | |
| 5,812,195 A * | 9/1998 | Zhang | 375/240.16 |
| 5,815,572 A * | 9/1998 | Hobbs | 380/215 |
| 5,844,628 A | 12/1998 | Hamano et al. | |
| 5,850,482 A * | 12/1998 | Meany et al. | 382/232 |
| 6,505,299 B1 * | 1/2003 | Zeng et al. | 713/160 |
| 6,700,992 B1 * | 3/2004 | Yu et al. | 382/100 |
| 2003/0161538 A1 * | 8/2003 | Chiba | 382/233 |
| 2006/0039478 A1 * | 2/2006 | Nonaka | 375/240.23 |

OTHER PUBLICATIONS

Methods for Encrypting and Decrypting MPEG Video Data Efficiently.

(Continued)

*Primary Examiner*—Christopher Revak
*Assistant Examiner*—Kaveh Abrishamkar
(74) *Attorney, Agent, or Firm*—Chernoff, Vilhauer, McClung & Stenzel (57) ABSTRACT

A method and an apparatus for error resilient, digital image scrambling are disclosed. Error resilience scrambling is produced by shuffling transform coefficients between arrays of coefficients arranged along an axis substantially orthogonal to the axis along which packetization of the coefficients proceeds. Scrambling transform coefficients requires a reasonable level of processing resources and has minimal impact on the efficiency of the compression process. Shuffling can be performed in a number of ways to provide good access security and a variety of security. Scrambling the image data in a direction substantially orthogonal to the direction of packetization of the transform coefficients distributes any transmission error in the image reducing the effects of data error or loss on the displayed image.

7 Claims, 5 Drawing Sheets

OTHER PUBLICATIONS

An Empirical Study of Secure MPEG Video Transmissions.
Efficient Frequency Domain Video Scrambling for Content Access Control.
Cryptology for Digital TV Broadcasting.
Digital Images Multiresolution Encryption.
Security Mechanisms for Multimedia-Data with the Example MPEG-I-Video.
Internet Video Using Error Resilient Scalable Compression and Cooperative Transport Protocol.
Error Control and Concealment for Video Communication: A Review.
RPT: A Transport Protocol for Real-Time Applications.
George Anastasios Spanos and Tracy Bradley Maples, "Performance Study of a Selective Encryption Scheme for the Security of Networked, Real-Time Video," Proceedings of the 4th International Conference on computer communications and Networks, 1995 IEEE, pp. 2-10.

* cited by examiner

FIG. 1

(PRIOR ART)

ERROR RESILIENT DIGITAL VIDEO SCRAMBLING

CROSS REFERENCE TO RELATED APPLICATIONS

Not applicable.

BACKGROUND OF THE INVENTION

The present invention relates to digital images and, more particularly, to a method of scrambling the images of a digital video sequence that is tolerant of transmission induced data errors.

Conditional access refers to the scrambling or encryption of a signal so that only a user having access to a key can gain access to the original signal. Conditional access permits a provider to supply services only to those users authorized to receive the service and is important to pay television, video-on-demand services, real-time video multi-cast services, and security systems. Conditional access is used in conjunction with video signals transmitted over a variety of communication channels including wireless broadcast, satellite communication, home networks, and the Internet.

Signal scrambling or encryption required for conditional access is problematic when used in conjunction with digital video. Typically, digital video includes a compression process. Without compression, the quantity of data necessary to digitally describe the succession of images making up a video sequence would be so great that transmission or storage would be impractical for many uses. On the other hand, compression produces interdependent data and data losses and errors resulting from transmission can cause an error to propagate to future images of the sequence.

The prior art of video scrambling includes methods that scramble a video signal in the spatial domain. For example, Hobbs, U.S. Pat. No. 5,815,572 discloses a number of techniques for scrambling the scan line signals of NTSC (National Television Standards Committee) analog television. One scrambling technique reverses the scan line signal so that the right end of the line becomes the left end and vice versa. Another disclosed scrambling method permutes the order of lines in a block comprising a plurality of scan lines. Similarly, the order of a plurality of blocks of lines making up a field or image can be permuted. In addition, a line might be scrambled by inverting the line signal. For instance, if a higher value of a luminance signal in a scan line represents BLACK and a lower value represents WHITE, the values could be inverted so that the lower values represent BLACK and the higher values represent WHITE. Generally, scrambling signals in the spatial domain significantly affects the statistical properties of the signal making it difficult to apply compression to reduce redundancies in the video signals. In addition, the correlation of video data that is scrambled in the spatial domain can be used as a basis for unscrambling the signal and obtaining unauthorized access to the video.

A second general method of scrambling digital images treats compressed image data as ordinary data to be encrypted with traditional cryptographic methods. Pinder et al., U.S. Pat. No. 5,684,876, disclose a method of applying a block cipher to the payload of MPEG Transport Stream packets. The disclosure indicates that a preferred cipher is the Digital Encryption Standard (DES). Likewise, the Real-Time Transport Protocol (RTP) which is commonly used in conjunction with the User Datagram Protocol (UDP) for digital video transmission supports encryption of packet payload data. However, considerable processing overhead is required to encrypt data at the high rates required for real time video. On the other hand, multimedia data may not be of sufficient value to justify the high cost of data encryption. To reduce the processing overhead, encryption can be applied to selected frames (for example, intra-coded frames) however, such limited encryption may not be sufficiently secure for many applications. The presence of known data such as synchronization and end of block symbols in the MPEG Transport Stream provides a basis for unscrambling the data and obtaining unauthorized access. Further, in some applications it is desirable to transcode the data so that the data may be transmitted over a communication channel requiring a data rate different from the data rate of the original encoding. The scrambling key must be available at transcoding points to permit decryption, decompression, re-compression and re-encryption of the data. Making the scrambling key available at a number of transcoding points is inconvenient and can jeopardize the security of the encryption.

One of the inventors of the present invention has proposed a method of video scrambling in which image data is shuffled following transformation. As described by Zeng et al. in the paper EFFICIENT FREQUENCY DOMAIN VIDEO SCRAMBLING FOR CONTENT ACCESS CONTROL, Proceedings of ACM Multimedia, November 1999, digital video may be scrambled by shuffling transform coefficients among the macroblocks making up a horizontal slice of a constituent image. Several scrambling techniques are disclosed providing excellent security for the signal. Since the scrambling is applied to the transformed image data, the statistical properties of the original image and the efficiency of the compression process are essentially unaffected by scrambling. However, video data is often transmitted over noisy communication channels by protocols providing unreliable delivery. As a result, data may be lost during transmission and retransmission or error correction is often impractical. Since packetization of video data proceeds along the horizontal slices of the image, video is susceptible to packet loss. Scrambling data along the direction of packetization may leave the image vulnerable to data errors because of the interdependence of the scrambled data describing the slice.

What is desired, therefore, is a method of image scrambling that provides appropriate security, utilizes reasonable data processing resources, has minimal impact on the efficiency of the compression process, and enables fault tolerant handling of errors or losses in the transmitted data.

SUMMARY OF THE INVENTION

The present invention overcomes the aforementioned drawbacks of the prior art by providing a method of scrambling a digital image comprising the steps of transforming a value for pixels of the image to an array of transform coefficients and selectively transposing at least one transform coefficient of at least two arrays, the arrays being arranged along an axis substantially orthogonal to an axis of packetization of the transform coefficients. Scrambling the coefficients resulting from transformation requires a reasonable level of processing resources and has minimal impact on the efficiency of the compression process. A number of scrambling options, such as changing the value of the coefficient before scrambling, scrambling luminance or chrominance signals, and scrambling selected images types, provide a selection of levels of security. Further, scrambling the signal in a direction substantially orthogonal to the direction of packetization of the transform coefficients distributes any transmission error in the image reducing the effects of data error or loss on the displayed image.

The error resilient video scrambling can be accomplished by a video encoder comprising a transform coder to transform a plurality of image pixels to an array of transform coefficients; a scrambling buffer storing a first and a second array of transform coefficients representing portions of the image pixels arrayed along an axis substantially orthogonal to an axis of packetization of the transform coefficients; a scrambler selectively transposing a coefficient of the first array to the second array; and a scrambling key identifying coefficients of the first for selective transposition to the second array by the scrambler.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
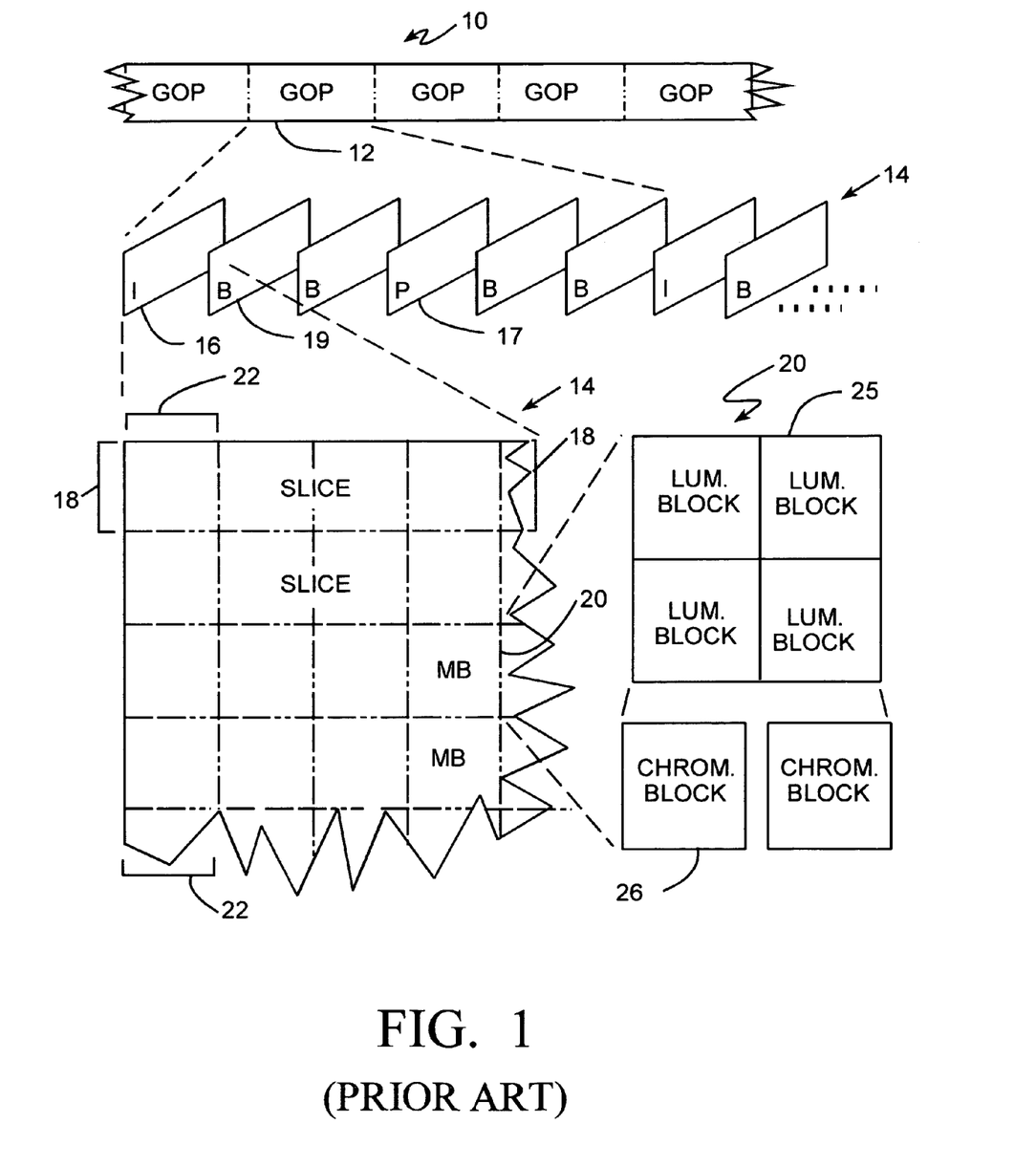
FIG. 1 is a schematic representation of the constituent data of a digital video sequence.

Referring to FIG. 1, a digital video sequence 10 comprises a succession of images 14 or pictures transmitted or stored as data packets in a data stream. Signals representing the images are captured by a camera or other device, converted to digital data, compressed, packetized, and transmitted or stored. At a display point, the data is decompressed and converted to signals which are used to control the display device. The quantity of data required to digitally describe the images of a video sequence is so great that digital video would be impractical for many applications without data compression. The objective of compression is the reduction of spatial and temporal redundancy in the data describing the succession of images.

Temporal redundancy is typically addressed by inter-coding or identifying the differences between successive images. If a reference image is available, a target image can be produced from the reference image and the differences between the two images. Therefore, it is only necessary to store or transmit the reference image and the differences between the reference image and any target images predicted therefrom. FIG. 1 is a schematic representation of the data of a video sequence illustrating division of the data for the purpose of block based transform coding by a video encoder utilizing a discrete cosine transform (DCT) as specified in the JPEG, MPEG-1, MPEG-2, and H.26X specifications. This encoder embodiment is described for purposes of illustration and not by way of limitation and the methods of the invention can be applied to other encoding processes, including wavelet-based encoding. An MPEG-2 digital video sequence 10 typically comprises a succession of Groups of Pictures or GOP 12 which, in turn, comprise a succession of coded images 14. While the number of images in a GOP 12 is not specified, a typical GOP includes approximately 15 images. Each GOP 12 includes an intra-coded (I) image 16 which is encoded as a discrete image, independent of other images, and requiring no additional information for decoding. I-images 16 provide access points to the stream of data permitting operations such as fast forward. I-images 16 also provide fault tolerance permitting access to the video data stream at the next I-image if data for several images are lost. In addition, the GOP 12 typically includes forward predicted (P-) images 17 which are predicted from an earlier image, and bidirectionally predicted (B-) images 19 that are predicted from both earlier and later I- or P-images.

Each image 14 of the sequence is represented by packets of data capturing horizontal sections or slices 18 (indicated by brackets) of the image 14. While the data may represent either a video field or video frame, either arrangement of data is referred to herein as an image or picture. The sizes of slices 18 are arbitrary and for MPEG video may start anywhere in the image. On the other hand, a slice 18 for ATSC (Advanced Television Systems Committee) digital television must start at the left edge of an image. The slice 18 is the fundamental unit of synchronization for the variable length and differential coding used in compression. A slice 18 or GOB (group of blocks) is a horizontal division of the image comprising at least one macroblock 20 and, typically, a horizontal strip of contiguous macroblocks. Macroblocks 20 are fundamental units of the image and are used in the motion estimation and compensation process that underlies inter-coding. Each macroblock 20 comprises four luminance blocks 25 and the chrominance blocks 26 that occupy the same spatial area of the image. The number of chrominance blocks 26 included in a macroblock is determined by the chrominance sub-sampling scheme used in the video coding process. In effect, the image 14 is segmented horizontally by slices 18 and vertically by columns of macroblocks 22 (indicated by a bracket) which, in turn, comprise vertical columns of blocks 25 or 26. The Real-Time Transport Protocol (RTP) is commonly used for transferring digital video data. Generally, the packet payload formats recommended by RTP facilitate packetization along the axis of the slices 18 or GOBs and synchronization words useful to recover from data errors and loss are available at the GOB or slice level.

Figure 3:
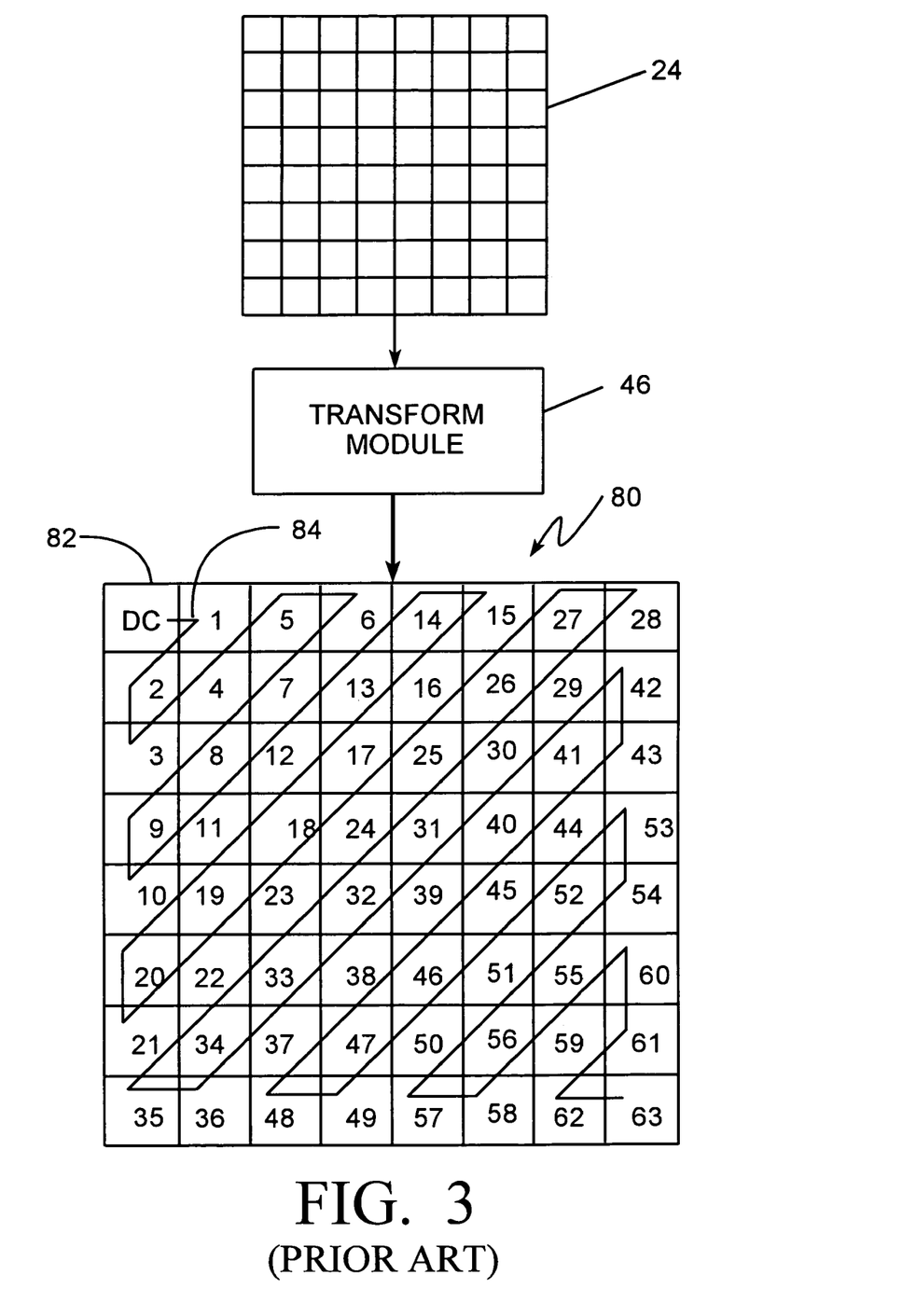
FIG. 3 is a schematic representation of block based transform coding.

In addition to temporal redundancies characteristic of successive images, individual images typically include spatial redundancies in the similarity of adjacent pixels in flat areas of the image and dominant frequencies in patterned areas. Spatial redundancy is reduced by intra-coding of individual images through the steps of transformation, quantization, and entropy encoding. Transformation applies an invertible transform to convert spatial domain data describing the image to a collection of coefficients describing the image in another domain, usually the frequency domain. For MPEG-2 transform coding the pixels of the individual luminance and chrominance signals are divided into 8×8 blocks. As illustrated in FIG. 3, a transform module 46 applies the DCT transform to blocks 24 of pixels, transforming the luminance or chrominance values of the pixels to an array of transform coefficients 80.

The succession of images 14 making up a video sequence 10 are captured by a camera or other device usually as analog signals representing the red, green, blue components of the light reflected by an object. The analog signals are converted to digital signals and the red, green, and blue values of the image pixels are typically converted to a luminance and two chrominance values. Typically, the chrominance of the image is sub-sampled because the human visual system is more sensitive to image luminance than chrominance. In addition to signal conversion, a pre-processor may arrange the image data so that images will be encoded in the order of their decoding. Since some of the images will be predicted from other images, the reference images must be decoded before the decoding of predicted images can proceed.

Figure 2:
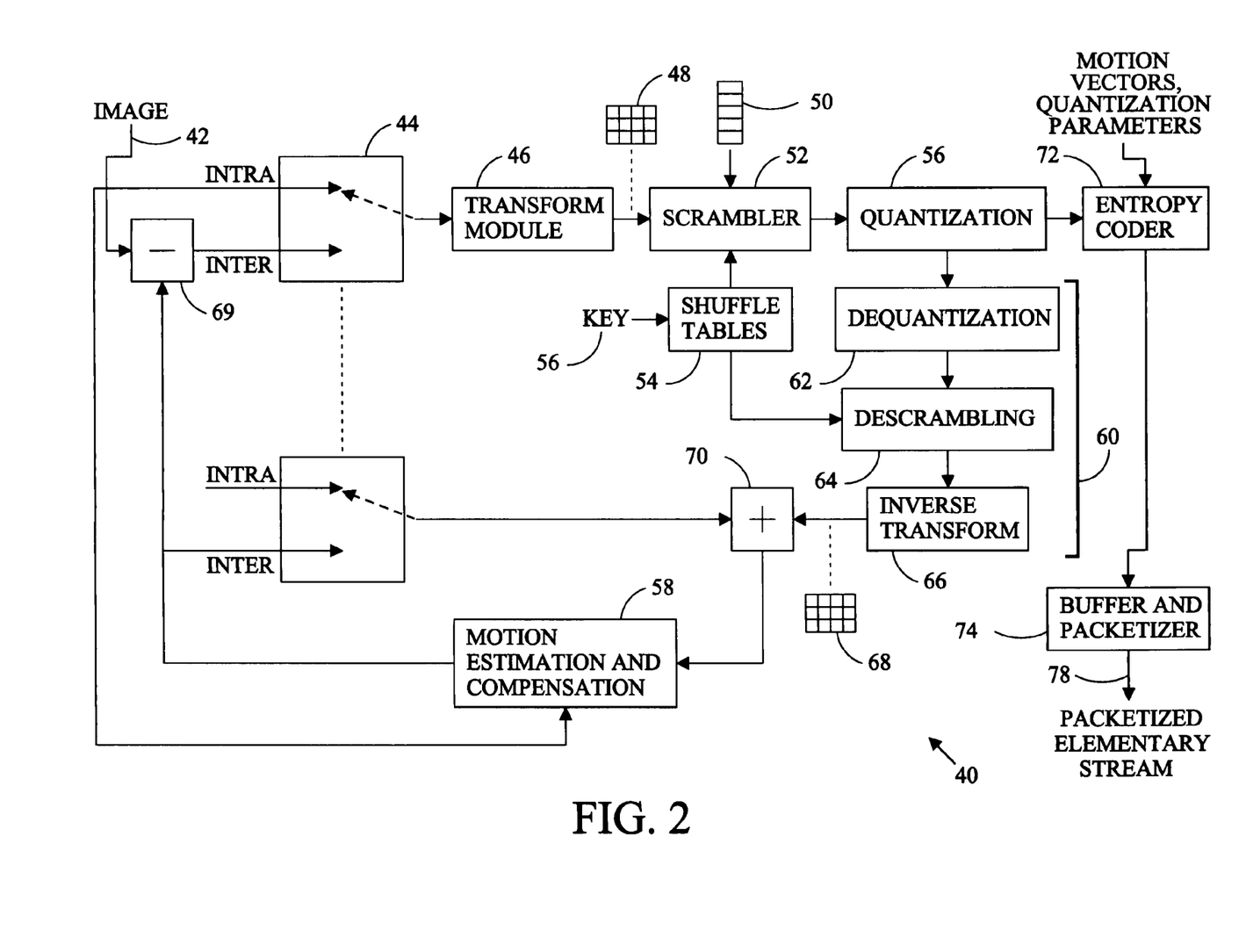
FIG. 2 is a block diagram of a video encoder incorporating scrambling according to the present invention.

Referring to FIG. 2, the pre-processed digital data representing an image are input 42 to the video encoder 40. Individual images of the sequence are either inter-coded or intra-coded as determined by the order in which they are input to the encoder 40. A switch 44 at the encoder input selects the encoding path appropriate for each image. For an intra-coded image the switch 44 directs the image to the transform module 46. Pixels from either the luminance or chrominance input data for the image 14 are mapped to 8×8 arrays of pixels or blocks 24. In the transform coder 46, the DCT is applied to the pixels of the block 24 and the luminance or chrominance values of pixels are transformed to an 8×8 array of transform coefficients 80 representing the frequencies of the block, as illustrated in FIG. 3. The coefficient 82 in the upper left corner of the block represents the DC coefficient for the block. Coefficients vertically below the DC coefficient 82 represent increasing vertical spatial frequencies and coefficients to the right of the DC coefficient represent increasing horizontal spatial frequencies. A DCT-based transformation applied to a typical image produces zero, or very small, coefficient values for many of the higher spatial frequencies. Coincidently, the human visual system is less sensitive to higher spatial frequencies so the zero coefficients and many of the smaller coefficients can be coarsely defined or eliminated without noticeable degradation of image quality.

Figure 4:
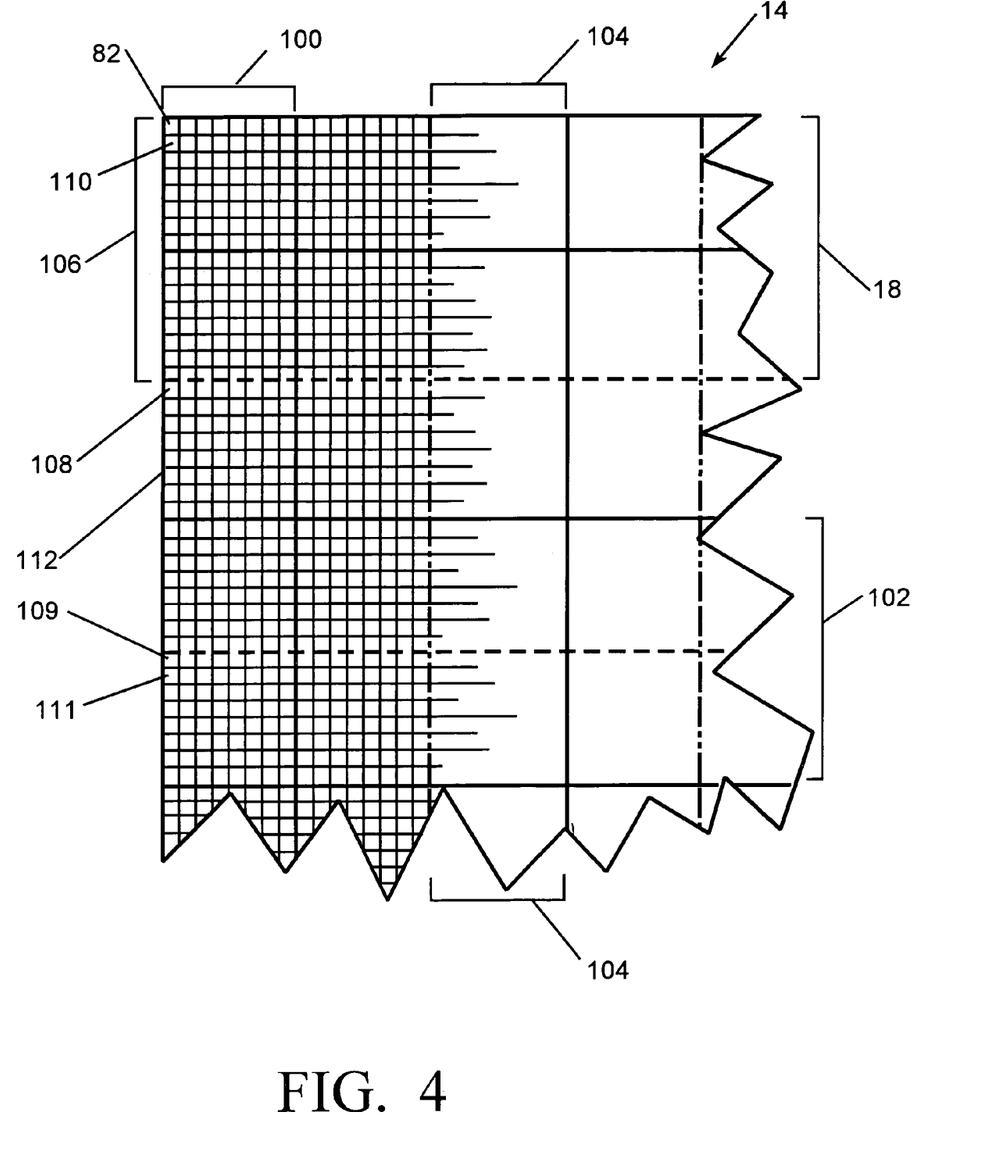
FIG. 4 is a schematic representation of a portion of a transform coded image.

The data representing the transformed image is accumulated in a transform buffer 48 at the output of the transform module 46. A schematic representation of a transformed luminance signal for a portion of an image 14 is illustrated in FIG. 4. Each 8×8 pixel block is represented by an 8×8 array or block of transform coefficients 100 (indicated by a bracket). Macroblocks of transform coefficients 102 (boundaries indicated by a bracket) comprise the four arrays of transform coefficients 100 representing the four pixel blocks of a luminance macroblock and the arrays of transform coefficients representing the chrominance of the area of the image occupied by the luminance block. FIG. 1 illustrates a subsampling of the image chrominance with two chrominance blocks 26 included in the macroblock 20. In general, the image 14 is represented by columns of transform coefficient arrays 104 (indicated by brackets) which are arranged orthogonal to slices 106 of coefficient macroblocks 102. The coefficient data for a column of blocks 104 is input to a scrambling buffer 50 of a scrambler 52. The scrambler 52 selectively transposes transform coefficients between the arrays in the column of arrays according to a shuffling table 54 which is controlled by a cryptographic key 56. A coefficient of a first array of an array column 104 is exchanged for a coefficient typically occupying the same band or frequency location in a second array of the column. For example, the DC coefficients 82 and 108 of two coefficient arrays 100 and 112 of a column of coefficient blocks might be transposed or the coefficients of several arrays of the column may be transposed by rotation through several blocks. For example DC coefficient 82 might replace DC coefficient 109 which, in turn, might replace DC coefficient 108 which may be used to replace coefficient 82. In addition, AC coefficients, for example coefficients 110 and 111, for one or more frequency locations may be permuted according to the same or a different shuffling scheme. Likewise, DC and AC coefficients may be permuted for the chrominance coefficient arrays. In addition, the transform coefficients may be altered. For example, the sign of a coefficient might be reversed if the coefficient has a predetermined relationship to a threshold value. The signs of AC coefficients may be inverted or DC coefficients may be assigned a negative sign if the value of the coefficient exceeds a threshold value. For additional security, the transform coefficients can be scrambled along macroblock columns where the coefficients are transposed horizontally as well as vertically. One luminance macroblock provides four similar coefficient positions (four arrays) within which coefficients can be transposed. The scrambler 52 scrambles the transform coefficient data along the columns of arrays 104 in a direction substantially orthogonal to the direction of data packetization which proceeds generally in the direction of the axis of the slices 106.

Following transformation and scrambling, the scrambled transform coefficients are quantized 56. Since the human visual system is less sensitive to higher spatial frequencies, weighting may be applied during the quantization process to further minimize the coefficients representing higher frequencies. Typically, quantization of video images uses up to eleven bits to represent the DC block coefficient and significantly fewer bits to represent the higher frequency coefficients. However, since scrambling is applied to the transformed data and transform coefficients from the same frequency locations in the arrays are transposed, scrambling does not affect the quantization process. Quantization is a lossy compression process and much of the data compression is accomplished in the quantizer 56.

If the input image 42 is to be an inter-coded (P or B) image the switch 44 selects the inter-coding position and the incoming image or target image is sent to the motion estimation and compensation unit 58 for comparison to one or more reconstructed reference images from which the target image is to be predicted. When a reference image has been quantized 56, a copy of the quantized data is sent to a decoder section 60 (indicated by a bracket) of the encoder 40. In the decoder section 60, the image is reconstructed by dequantization 62, unscrambling 64, and inverse transformation 66 and the reconstructed image stored in a reference frame storage 68. The descrambler 64 reverses the transform coefficient shuffling performed by the scrambler 52 using the same shuffling table 54 and key 56 used by the scrambler to shuffle the coefficients.

To encode a target P-image, the motion estimation and compensation unit 58 compares a reference I-image in the reference frame storage 68 to the input target image to determine forward motion vectors. In the motion estimation and compensation unit 58 macroblocks of the current image are moved incrementally over a search range in the reference image until the greatest correlation between the current macroblock and a corresponding region in the reference image is obtained. Motion vectors indicating the necessary horizontal and vertical movements of matched region are calculated and recorded in the header of the macroblock in the data stream. The motion vectors are transmitted to the decoder for use in conjunction with reference image data in decoding the predicted images. The reference I-image is shifted by the motion vectors to construct a predicted P-image which is then subtracted 69 from the input image to produce a prediction error. The prediction error or residual data is input to the transform coder 46 and quantizer 56 and spatially coded. The prediction error may also be scrambled in the scrambler 52. In general, scrambling the coefficients of I-images 16 will render any predicted P- or B-images difficult to perceive because of the data dependency of the predicted frames. While the P- and B-images may not need to be scrambled, the motion of the video sequence is often visible unless the motion vectors are scrambled. Motion vectors can be scrambled by assigning signs to the vectors exceeding a threshold or the vectors can be shuffled. The prediction error is also reconstructed in the decoder section 60 and added 70 to the predicted P-image to create a locally decoded P-image that is stored in the reference image storage 68 for use as a reference image in encoding appropriate P- or B-images.

If the input image is to be coded as a B-image, the motion estimation and compensation unit 58 compares the target B-image with the reference images that precede and follow the target image and which are stored in the reference image storage 68. Forward and backward motion compensation is performed to produce a two predicted B-images. These are subtracted from the target B-image and the data from either the forward or backward motion compensation that represents the least difference is spatially coded and sent with the motion vectors.

Entropy coding 72 is applied to the arrays of transform coefficients following quantization 56. Referring to FIG. 3, typically, a block of coefficients is scanned in a zig-zag pattern 84 that maximizes the runs of zero value coefficients. The entropy encoder 72 applies lossless compression methods such as variable length encoding and run length coding to further reduce the quantity of data. Variable length encoding identifies common patterns in the data and uses codes to identify frequently occurring patterns. Run length encoding uses a unique code word to identify a repeating pattern of bits in the data stream and outputs the number of bits in the pattern rather than the individual bits. The motion vectors and other macroblock and slice header information are typically added to the data stream at the entropy encoder 72.

The video elementary data stream at the output of the entropy encoder 72 is input to a packetizer and buffer unit 74. For convenience, the elementary stream may be broken into data blocks by the packetizer and buffer unit 74 to form a packetized elementary stream (PES). While the data stream follows the zig-zag pattern through the blocks or arrays of transform coefficients, the axis of the packetization is generally along the horizontal axis of the slices 18 of the images.

Video data systems are typically designed to utilize data at a near constant rate. However, the data rate output by the entropy encoder 72 varies because of the differing quantities of data required to encode the various images. The buffer of the packetization and buffer unit 74 smooths the flow of elementary stream data 74 from the encoder 40 and provides a mechanism for controlling the encoding rate. Following encoding by the video encoder 40, timing information is added to the packetized elementary stream and video, audio, and data elements of the video program are combined by a program or transport stream multiplexer to produce a program data stream for storage or a transport stream for broadcasting.

Figure 5:
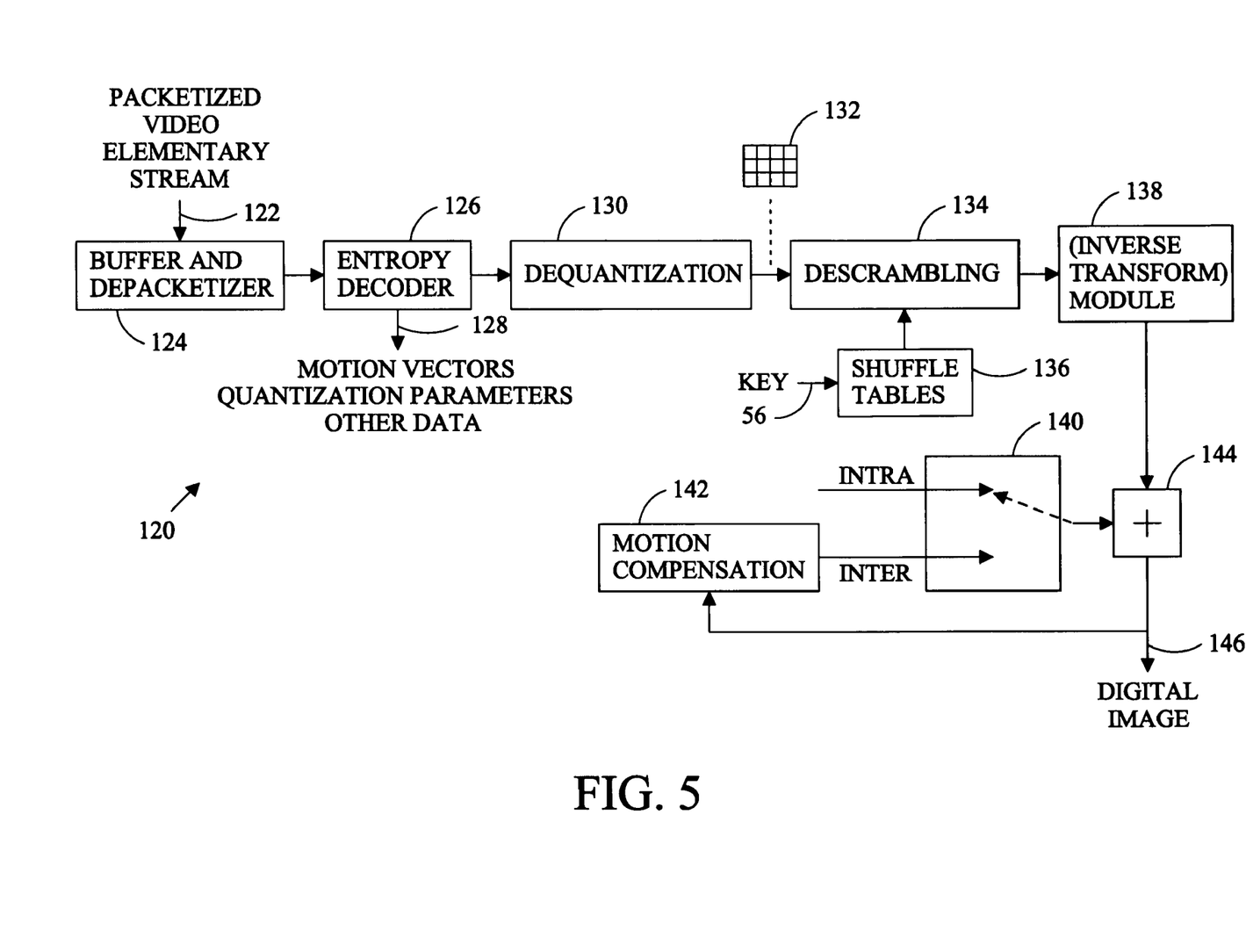
FIG. 5 is a block diagram of a video decoder and descrambler.

To display the video sequence, the elements of the program or transport data streams are separated and decoded. Referring to FIG. 5, the scrambled video elementary stream 122 resulting from the separation of the program or transport stream is decoded in a video decoder 120. In the decoder 120 the encoding process is reversed to produce signals for controlling the operation of a display, transcoding device, or other information sink. Elementary stream packets 122 are input to a buffer and depacketizer unit 124 to smooth the data flow to the decoder and remove the elementary stream packetization information. The resulting data stream is input to an entropy decoder 126 that recovers the motion vectors, quantization parameters, and other data 128 from the encoded data stream and reverses the entropy encoding. A de-quantizer 130 reverses the quantization process of the encoder 40 to produce blocks of transform coefficients that are stored in the frame buffer 132. Data for columns of image blocks are input to a descrambler 134 where shuffling tables 136, duplicating those used in encoding the data, are used to reverse the scrambling of the transform coefficients. The key 56 used in scrambling the data and obtained from the encoder 40 is used to establish the shuffling table 136 for unscrambling the data stream. Following unscrambling, the transform coefficients are input to the inverse transform module 138 which applies the inverse transform to produce luminance and chrominance data describing an image that approximates the original image. If the data represents a B- or P-image the switch 140 selects the inter-coding position and a motion compensation unit 142 utilizes the motion vectors obtained from the entropy decoder 126 to determine the differences between the target image and the reference image. The difference data is added 144 to the data for the reference image to produce the data describing the digital image 146 which may be further processed to create signals appropriate to operate a display or other device. Since scrambling is applied to transform coefficients and occurs along an axis orthogonal to the axis of elementary stream data packetization, the scrambling has minimal effect on compression efficiency and the effect of any data loss or error is distributed more widely in the image producing fewer visually noticeable effects on the reconstructed image.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of scrambling a sequence of digital images comprising the steps of:
   (a) selecting at least one said image for coding as a discrete image;
   (b) transforming respective values of said pixels of said discrete image to a plurality of arrays of transform coefficients;
   (c) selecting a plurality of said arrays arranged with respect to each other along a first axis of said image;
   (d) transposing selective one or more coefficients of a first of said selected arrays with selective one or more coefficients of a second of said selected arrays, wherein every step by which a coefficient is transposed, transposes said coefficient in at least a direction along the direction of said first axis, and being identified by a cryptographic key; and
   (e) packetizing said coefficients of said plurality of arrays along a second axis orthogonal to said first axis.

2. The method of claim 1 wherein said coefficient of said second selected array occupies a same position in said second selected array as said replaced coefficient occupies in said first selected array.

3. The method of claim 1 wherein a luminance representation of said pixels is transformed to said array of transform coefficients.

4. The method of claim 1 wherein a chrominance representation of said pixels is transformed to said array of transform coefficients.

5. The method of claim 1 further comprising the step of altering a value of coefficient of said second of said selected arrays.

6. The method of claim 1 wherein said selected plurality of arrays arranged along a first axis of said image includes a first and a second pluralities of said arrays, said first and said second pluralities aligned with said first axis but displaced from each other along said second axis.

7. The method of claim 1 further comprising the steps of:
  (a) selecting at least one image for prediction from said discrete image;
  (b) determining a difference between said predicted image and said discrete image;
  (c) transforming pixels of said difference to a plurality of arrays of transform coefficients;
  (d) selecting a plurality said arrays arranged along a first axis of said image;
  (e) replacing a coefficient of a first of said selected arrays with a coefficient of a second of said selected arrays, said coefficients of said first and said second arrays being identified by a cryptographic key; and
  (f) packetizing said coefficients of said plurality of arrays along a second axis orthogonal to said first axis.

* * * * *